G. A. BINGHAM.
BUTTER AND LARD BLOCK CUTTING MACHINE.
APPLICATION FILED MAY 3, 1910.

984,064.

Patented Feb. 14, 1911.

5 SHEETS—SHEET 1.

ATTEST
E. M. Fisher
J. C. Museum

INVENTOR
GEORGE A. BINGHAM
By Fisher & Moser
ATTYS.

G. A. BINGHAM.
BUTTER AND LARD BLOCK CUTTING MACHINE.
APPLICATION FILED MAY 3, 1910.

984,064.

Patented Feb. 14, 1911.

5 SHEETS—SHEET 2.

INVENTOR
GEORGE A. BINGHAM

G. A. BINGHAM.
BUTTER AND LARD BLOCK CUTTING MACHINE.
APPLICATION FILED MAY 3, 1910.
984,064.
Patented Feb. 14, 1911.
5 SHEETS—SHEET 3.
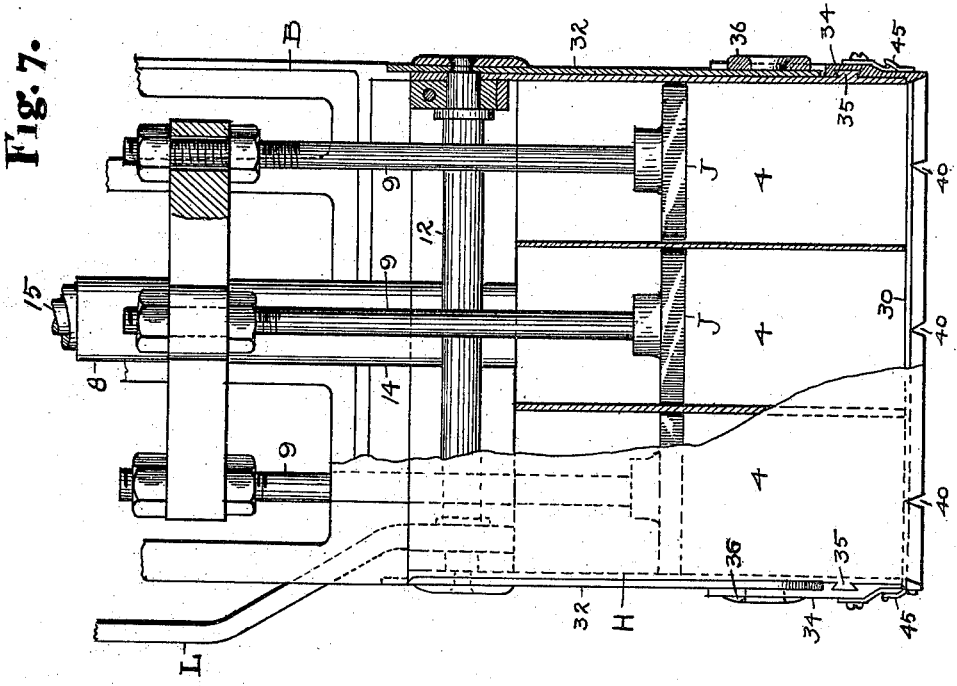
ATTEST
INVENTOR
GEORGE A BINGHAM.
BY Fisher & Moser ATTYS.

G. A. BINGHAM.
BUTTER AND LARD BLOCK CUTTING MACHINE.
APPLICATION FILED MAY 3, 1910.
984,064.
Patented Feb. 14, 1911.
5 SHEETS—SHEET 5.
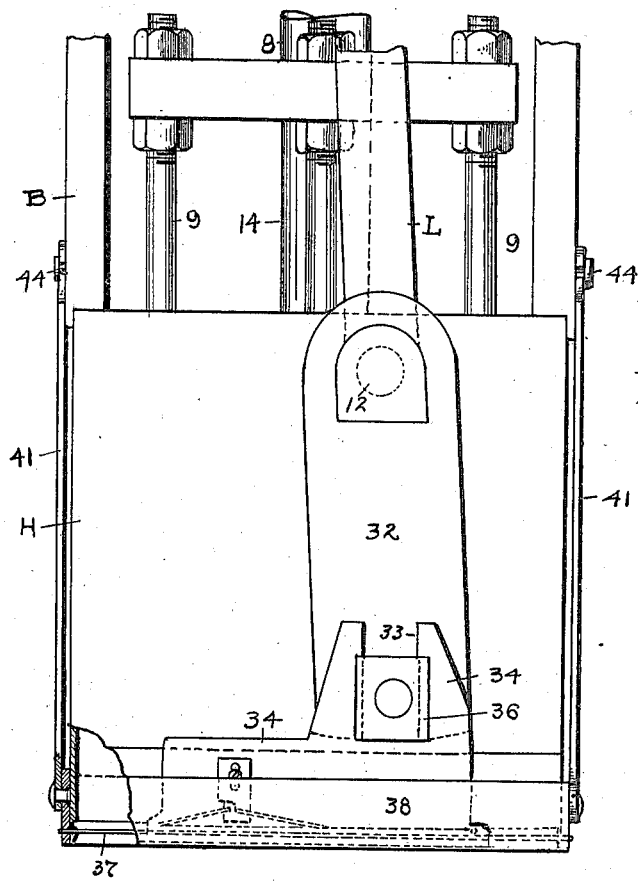
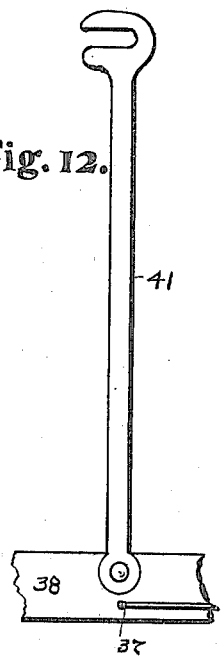
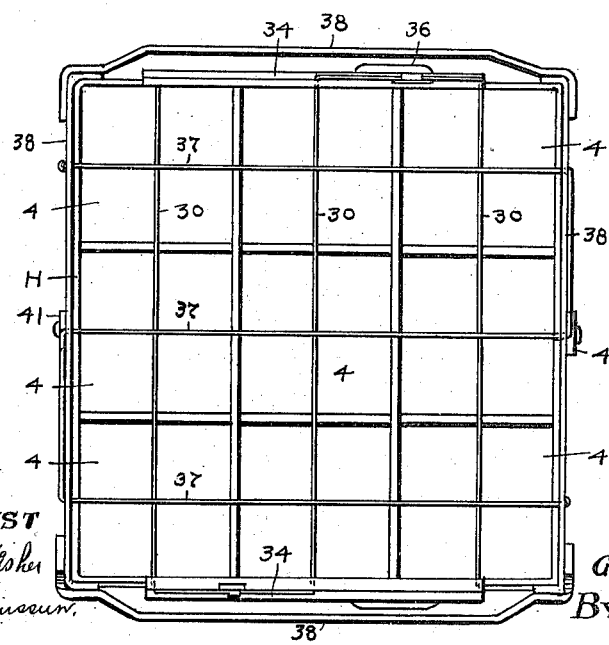
ATTEST
E. M. Fisher
J. C. Musson
INVENTOR
GEORGE A. BINGHAM
By Frahn & Moser
ATTYS.

UNITED STATES PATENT OFFICE.

GEORGE A. BINGHAM, OF CLEVELAND, OHIO.

BUTTER AND LARD BLOCK CUTTING MACHINE.

984,064.   Specification of Letters Patent.   Patented Feb. 14, 1911.

Application filed May 3, 1910. Serial No. 559,130.

*To all whom it may concern:*

Be it known that I, GEORGE A. BINGHAM, citizen of the United States, residing at Cleveland, in the county of Cuyahoga and State of Ohio, have invented certain new and useful Improvements in Butter and Lard Block Cutting Machines, of which the following is a specification.

My invention relates to a butter and lard block cutting machine, and the invention consists in the construction and combination of parts substantially as shown and described and particularly pointed out in the claims.

Figure 1:
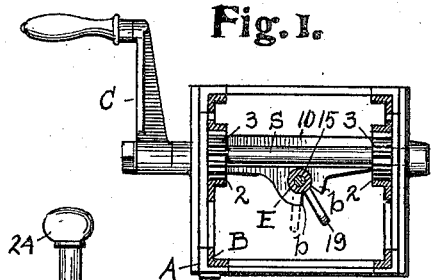
Figure 2:
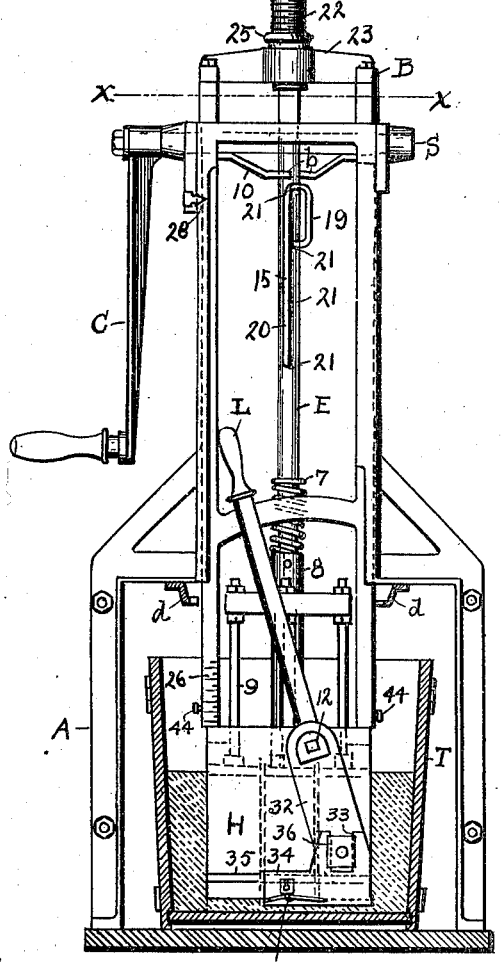
Figure 3:
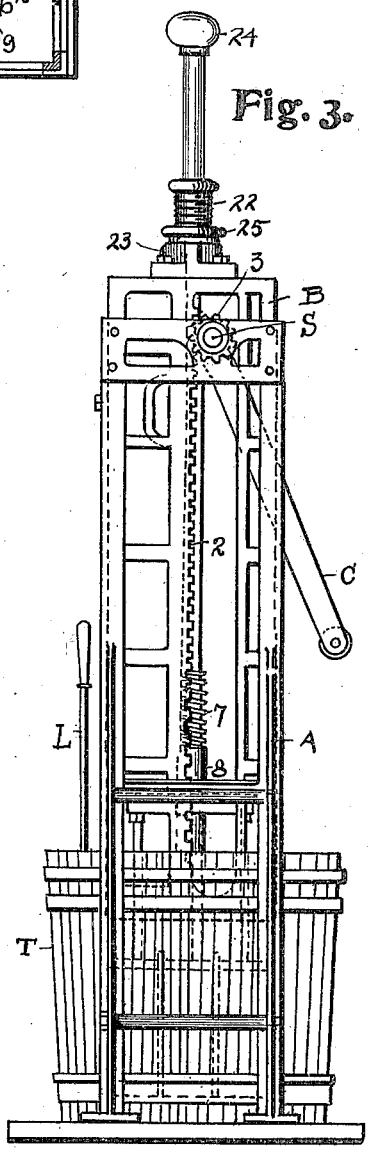
Figure 4:
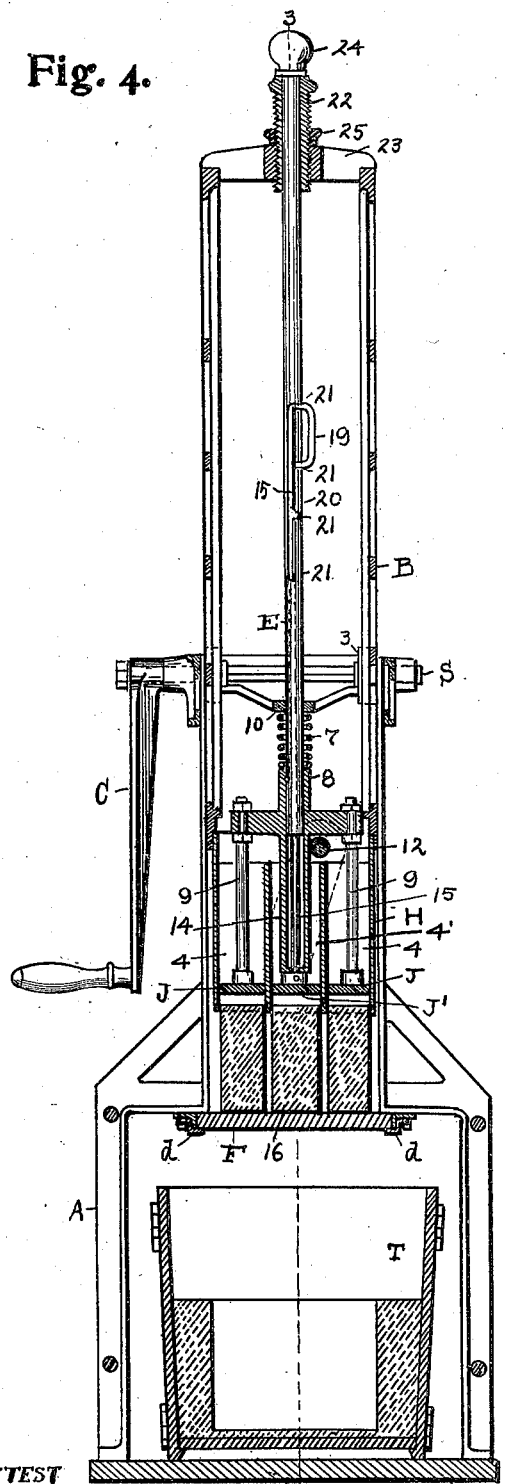
Figure 5:
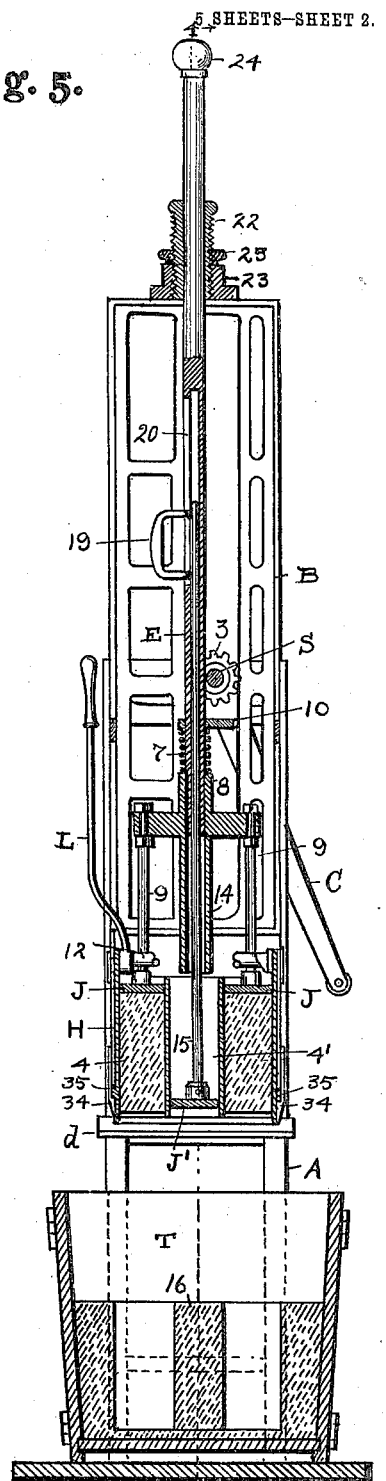
Figure 8:
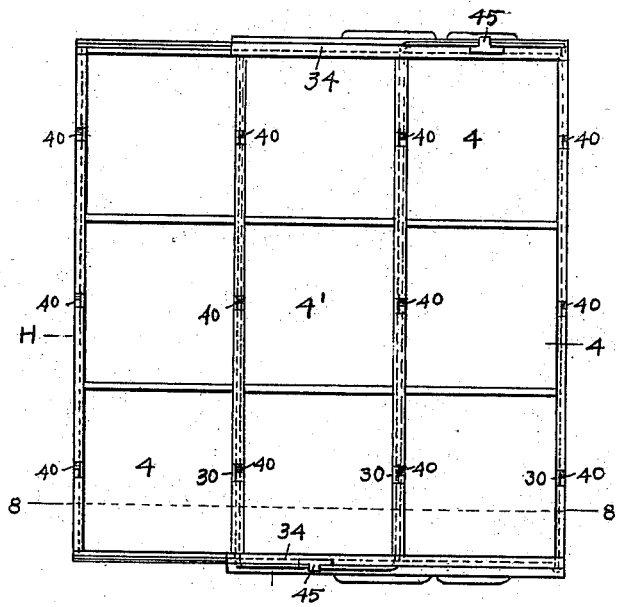
Figure 9:
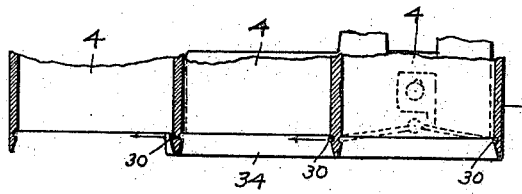
Figure 10:
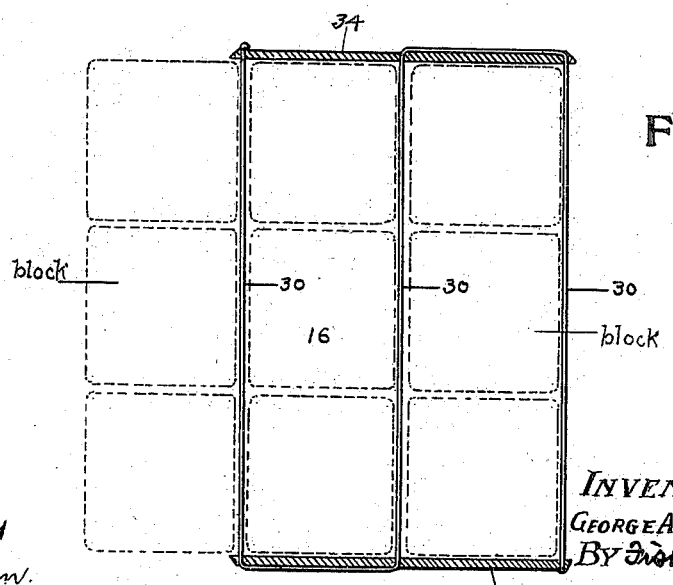

In the accompanying drawings, Figure 1 is a cross section of the upper portion of the machine on line x—x, Fig. 2. Fig. 2 is a front elevation of the machine partially sectioned in its lower portion, and Fig. 3 is a side elevation at right angles to Fig. 2 with the cutter down in both cases. Fig. 4 is a vertical central sectional elevation on a line corresponding to 4—4, Fig. 5, and Fig. 5 is a sectional elevation corresponding to line 3—3, Fig. 4, with the cutter head raised in both views, but to different elevations. Figs. 6 and 7 are side elevations of the cutter head at right angles to each other and considerably enlarged, Fig. 6, corresponding substantially to Fig. 2, and Fig. 7 to Fig. 3, in so far as the cutter head is concerned. Fig. 8 is a bottom view of the cutter head and Fig. 9 is a sectional elevation of a portion of Fig. 8 on line 8—8 thereon. Fig. 10 is a diagram showing arrangement of the transverse cutting wires. Fig. 11 is an elevation of the lower portion of the cutter corresponding in the main to Fig. 6, but varying in some details as hereinafter described. Fig. 12 is a side elevation of one of the hook or latch members at the side of the attachment to the head, and Fig. 13 is a bottom view of the cutter attachment or cutter proper removably secured in or to the cutter head.

As thus shown the machine comprises a skeleton main frame A and an inner operating frame B slidable in guideways in the angular corners of the main frame and adapted to be raised and lowered in respect to the tub T, which contains the butter or lard, or the like.

Operation of frame B is through rack-bars 2 on said inner frame engaged by pinions 3 on transverse shaft S in the top of the main frame and controlled by a hand crank C. This mechanism is adapted to operate frame B within the required limits up and down and which is shown as down in Figs. 2 and 3 and up or raised and ready to discharge the blocks of butter therefrom, or rather from the head thereon, as seen in Figs. 4 and 5. The said head H, so-called, is a sheet metal member having as many sub-divisions 4 as the outer dimensions thereof will warrant and according to the size or weight of blocks of butter to be made. I may, therefore, have interchangeable heads varying in the side of the sub-divisions or chambers 4 but in this instance containing nine such chambers or spaces. The depth of the head also may vary considerably and be more or less elongated in some cases as compared with others so that it will be equal to the full depth of a comparatively deep tub. In that case the cross section of the butter chambers or spaces 4 would be relatively smaller in cross section than herein shown and said head is fixed to the lower portion of frame B as an extension thereof. Said spaces or subdivisions 4 are open at both ends, so that when pressed down into the butter they will fill more or less according to their descent into the butter and the depth of the butter in the tub or other vessel. At the top the said spaces are open to receive the plungers or ejectors J to thrust the blocks of butter therefrom, and this is shown as having just been accomplished in Fig. 4. In this view a receiving board F is shown as having been inserted from the side and the blocks of butter deposited thereon from the said head H. This is or was accomplished by raising the head with frame B through the crank and rack mechanism above described as against the approximately stationary but somewhat yieldable ejectors J. This appears clearly in Fig. 4, where a special spring 7 about central tube E bears on the hub head 8 on which said ejectors are supported by rods 9 rigid therewith and which spring bears against fixed cross piece 10 at its top rigid with main frame A. The limit of possible play of said head 8 is between cross shaft 12 beneath the said head and said cross-piece 10, less the space occupied by said spring, and the spring is provided to get a cushioned effect rather than a dead stop for the ejectors against a fixed cross-piece. The said shaft 12 is in fixed bearings in outer frame A, and is operated by lever L as will presently be seen. By this construction the plunger head 8 cannot drop beneath shaft 12 or rather is detained thereby when head H descends into the butter and takes its load, and then as soon as the loaded head is raised high enough to insert the board F the plungers or ejectors come into acting relation against spring 7 and are ready to do their work as said head is raised to its maximum elevation approximately as seen in Fig. 4.

The ejector head 8 has a tubular stem 14 at its bottom and the middle sub-division 4' of head H is provided with an ejector J' having an operating rod 15 adapted to slide in said stem 14 and tube E above and to operate said ejector J' independently to get a testing block 16, Fig. 5, from out of head H to ascertain weight thereof. It is well known to experienced butter men that different butters weigh differently, and that a block of a given size in one lot of butter may weigh an ounce or two, more or less, heavier or lighter than another block of the same size of a different make of butter. Hence by first getting a testing block out of a lot one can weigh it up and see how it compares with the standard on which the machine is set, say one or two pound prints. This is done by discharging said block into the tub and then weighing it individually, and if it shows overweight the head H is lowered again into the tub and the machine is set to the exact amount now ascertained to be right whether higher or lower than the original adjustment of the head. This being done the head is again raised and this time presumably with the right weight in each block and the said blocks are ready to be discharged upon board F to be carried away.

Returning now to testing ejector J', the stem or rod 15 thereon has a handle 19 adapted to slide lengthwise in a slot 20 in tube E and to be rotated into notches 21 therein when the said parts are to be locked in raised or lowered position in respect to the ejectors J; and the two positions are seen in Figs. 4 and 5. Again, for the purpose of adjusting head H to different elevations according to the weight of the block or print to be made I provide the tube E upon which the said head 8 is secured with an adjusting sleeve 22 at the top of inner frame B threaded through a cross-piece 23 on said frame and through which said tube E extends with a hand knob 24 at its top adapted to rest on the top of said sleeve. A lock nut 25 secures said sleeve in any desired adjustment. A scale 26 is shown on frame B adapted to be used in connection with pointer 28 higher up in Fig. 2 for fixing the position of the cutting wires at the bottom of head H. These wires are indicated by 30, and are adapted to sever the blocks transversely into prints of one size or another as may be wanted. That is a single block of any given depth may be cut into two or more pieces of equal size by using scale 26, and lever L serves to throw said wires across head H when severing is to occur, said wires each having a travel across a single block, and lever L operates said wires through shaft 12, which is rotated axially by said lever and which has flat arms 32 fixed rigidly thereon at their upper ends and operate loosely or freely in vertical open slots 33 in side plates 34 to which said wires are fixed at their ends and are adapted to slide on dovetailed guides 35 horizontally on the outside of head H. A button 36 on each side with a head outside said slot 33 and a shank in said slot and fixed in plate 32 provides all the engagement required for said plates and arms as they travel laterally together, the arms 32 sliding up and down in said slots a limited measure as the parts are thrown to one side or the other.

Wires 37 are provided for cutting the butter at right angles to wires 30 and traverse the block of butter vertically. These are secured to a separate frame 38 removably engaged about the outside of the bottom of head H and having its wires corresponding to V shaped notches 40, Fig. 7, into which said wires project. Said frame is suspended in place by hooks or hasps 41 on opposite sides engaged on headed lugs or projections 44 on frame B.

Tension hooks 45 are shown in Fig. 6 and adjustable on head H to stretch the wires 30, which are in fact a single strand of wire. These hooks may be substituted by ratchet and pawl mechanism rotatably mounted and locked by screws or the like.

Referring to Fig. 2, when hand grip 19 is in the notches 21 it will pass up between the ends of stops $b$ and not be disturbed, but when not in said notches it will be engaged by said stops and cause depression of ejector J'. The board or plate F rests on right angled guides and supports $d$, Fig. 4, fixed on main frame A, and said board is removed with the butter thereon by sliding the same laterally. Any suitable means may be employed to detain or hold frame B at any elevation at which it may be stopped, whether by frictional or other means.

What I claim is:

1. In a butter cutting machine, a frame having a sub-divided cutter-head at its bottom, ejectors for the butter adapted to enter said sub-divisions and one of said ejectors independently mounted to eject a single block of butter while the other blocks remain in the head.

2. A butter cutter having a vertically sub-divided cutter-head and means to raise and lower the same, in combination with a series of ejectors and a head therefor and a shaft on which said head is slidably mounted, and one of said ejectors having a stem slidable in said shaft and adapted to be independently operated.

3. A butter cutter having a cutter-head adapted to be raised and lowered, in combination with a series of ejectors adapted to enter said head and a cross-head carrying the same, a tubular shaft on which said cross-head is slidably mounted, fixed stops for said cross-head above and below, and one of said ejectors having a stem extending up into said tubular shaft and adjustably engaged therein.

4. A butter cutter comprising a cutter-head, cutter wires at the bottom of said head and supports therefor laterally slidable on said head and means to move said supports jointly back and forth.

5. A butter cutter head and cutter wires at the bottom thereof, supports for said wires slidable horizontally on said head, a rotatable shaft and rigid connections therewith loosely engaging said wire supports and adapted to slide the same back and forth.

6. A butter cutter head, a series of cutter wires across the bottom thereof and a frame carrying said wires removably supported about the outside of said head.

7. In butter cutters, an inner frame, a butter cutter head thereon, a cutter frame about the bottom of said head and means engaging said cutter frame detachably with said inner frame.

8. A butter cutter having a main frame and an inner frame slidable therein and a sub-divided cutter-head on the bottom thereof, in combination with a vertically adjustable shaft centrally in said inner frame and a series of ejectors mounted thereon, and means at the top of said shaft adapted to adjust the same higher or lower in working relation to said inner frame, and whereby said ejectors may be set in respect to said cutter head.

9. The main frame and the inner frame and rack and gear mechanism to raise and lower said inner frame and a scale and a pointer on said frames respectively, in combination with butter ejectors and a shaft carrying the same and means on said shaft at the top of said inner frame to set said ejectors to work at different elevations.

In testimony whereof I affix my signature in presence of two witnesses.

GEORGE A. BINGHAM.

Witnesses:
E. M. FISHER,
F. C. MUSSUN.